United States Patent Office 3,734,741
Patented May 22, 1973

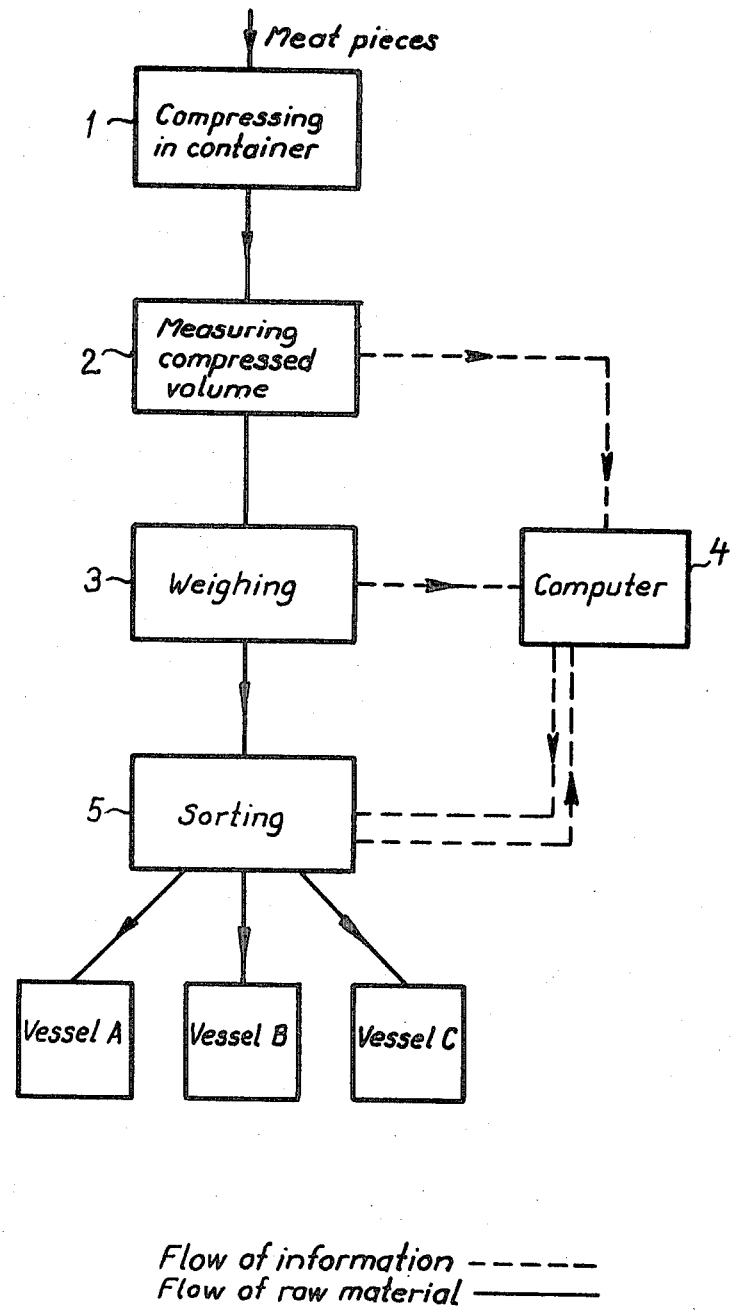

3,734,741
METHOD OF OBTAINING MEAT WITH A PREDETERMINED FAT CONTENT
Hans Christian Larsen, Lyngby, Denmark, assignor to Alfa-Laval AB, Tumba, Sweden
Filed May 28, 1971, Ser. No. 147,795
Claims priority, application Denmark, May 28, 1970, 7,349/70
Int. Cl. A22c *18/00*
U.S. Cl. 99—107                              3 Claims

ABSTRACT OF THE DISCLOSURE

After ascertaining the fat content of separate quantities of meat by calculating the specific gravity of each quantity, the separate quantities are distributed by way of a selecting step to a plurality of collecting vessels while determining the total fat content of the total meat quantity in each vessel. In the selecting step, each separate meat quantity is directed selectively, with reference to its fat content and according to the total fat content determination, to one of the collecting vessels to obtain a meat mass with a predetermined fat content.

---

The present invention relates to a method of obtaining meat with a predetermined fat content from large or small pieces of meat with a varying fat content.

In recent years there have been increased demands for close control of the nutritive value of different food products. In order to fulfill these demands, it is necessary for industries producing meat products, such as canned or cured meats, to have access to a meat material with a certain fat content.

The raw material for these industries consists mainly of large or small pieces of meat obtained by cutting up the carcasses. The hitherto used method of producing a meat mixture with a fixed fat content from such pieces of meat is both labor-demanding and cumbersome. The pieces of meat are manually sorted into three groups; fat, marbled and lean meat. This sorting is done after a visual classification of the meat. Charges of each group are then minced and homogenized in a mixing machine. In some cases the minced material is used in the production on the basis of the aforementioned visual classification. In other cases, samples are taken from each charge and the fat content of the mixture is determined. If the fat content in the charge is too low, more fat meat is added, and if it is too high, more lean meat is added instead. In this way, a mixture with the desired fat content is obtained after a number of samplings and additions.

In addition, this prior method results in the disadvantages that the minced raw material has impaired keeping qualities and requires an immediate use in the production. The fact that the meat is minced also restricts the fields in which the meat material can be used.

The present invention provides a new method of obtaining a meat material with a predetermined fat content and which avoids the above-mentioned disadvantages. According to the new method, the preliminary mincing of the material can be entirely avoided, which means that the fat content can be controlled also in connection with the production of canned foods containing large pieces of meat.

According to the invention, the fat content in quantities of meat is determined by calculating the specific gravity, after which these quantities are directed according to their fat content to one of several collecting vessels, the fat content of the total quantity of meat in each collecting vessel being continuously calculated and controlled in such manner that the predetermined fat content is obtained.

The method according to the invention makes use of the known relation between the specific gravity and the fat content of a meat material. Knowing this relation, it is possible to determine the fat content of a piece of meat from its specific gravity.

The specific gravity of the pieces of meat is preferably determined by weighing a volume of pieces of meat, when the volume has been defined by compressing pieces of meat in a container of the type which permits reading off the degree of filling. The compression of the meat should be carried out in conjunction with the evacuation of enclosed air, and it is suitably performed by means of a piston which exerts a fixed pressure on the meat, the position of the piston after the compression showing the volume of the meat. The quantity of air which remains in the meat after the evacuation and the compression can be neglected.

After the volume of the compressed meat has been read, the meat quantity is weighed either in the measuring container or after having been pressure out from the same. The information about the weight and the volume of the meat quantity is used for calculating the specific gravity of the meat quantity and, in consequence, its fat content. A classification of the meat quantities according to their fat content is then performed, and the meat quantities are transported to one of a number of collecting vessels.

A computer is preferably used for calculating the specific gravity of the meat quantities from data representing their weight and volume, for a continuous calculation of the fat content of the total quantity of meat in each collecting vessel, and for directing the supplying to the collecting vessels in such a way that the predetermined fat content in the same is obtained.

The method according to the invention is further described below with reference to the accompanying drawing, in which the single illustration is a flow chart of one embodiment of the invention chosen only as an example.

Pieces of beef meat from the carcass-cutting are fed to a container where they are subjected to a compressing operation 1 while evacuating air from the container. The volume of the compressed meat is determined by a measuring step 2, in the manner previously described, and the reading shows a volume of 50 dm.$^3$. The meat is pressed from the container and deposited upon a conveyor belt on which the meat is subjected to a weighing operation 3 when the belt arrives at a balance or other weighing device. The weight of the compressed pieces of meat is found to be 51.3 kg., so that the specific gravity of this quantity of meat is calculated to be 1.026. From a chart showing the relation of specific gravity to fat content for beef, it is found that the specific gravity of 1.026 corresponds to a fat content of 16%.

Through an arrangement directed by a computer 4, the fat content value (16%) of this first quantity of meat is stored in the computer. Similarly, other separate quantities of meat from the carcass-cutting are individually measured as to volume (while compressed in a container) and weighed; and the fat content value of each quantity, as determined from the volume and weight measurements, is stored in the computer 4.

Of three collecting vessels A, B and C, the fat content of the meat should be 16% in vessel A and 18% in vessel B, the vessel C being used for the collection of meat quantities which, because of their too high fat content, cannot be placed in either vessel A or vessel B.

The separate quantities of meat from the weighing step 3 are each delivered to a selected one of the collecting vessels A, B and C by way of a sorting operation 5 under control of the computer 4. Each meat quantity having a fat content of 16%, as determined from the values obtained by steps 1–3, is directed by the computer-sorting 4–5 to vessel A, as is also the case with respect to meat quantities having a fat content lower than 16%. Any meat quantity having a fat quantity higher than 16% is directed to vessel A only if the total fat content of the total meat in vessel A, calculated by the computer, is lower than 16%. Otherwise, such meat quantity having more than 16% fat is directed to one of the vessels B and C. Similarly, meat quantities with a fat content of about 18% are directed to vessel B, except as noted above; and meat quantities with a substantially higher fat content are directed to vessel C. Thus, the meat quantities are distributed to the three vessels according to the fat content of the meat quantities except that a vessel having a total fat content lower than the intended value can receive a meat quantity higher than the intended value in order to obtain the intended value.

The computer 4 adds up the weight of the meat which has been directed to each of the vessels A, B and C; and when a vessel is filled, the computer gives a signal and makes out the weight of the total quantity of meat and the calculated total fat content.

It will be understood that the various values noted above are stated only by way of example and that the foregoing description is not intended to limit the invention as defined by the claims.

I claim:

1. The method of obtaining a meat mass having a predetermined fat content from pieces of meat with a varying fat content, said method comprising the steps of calculating the specific gravity of each of separate quantities of said meat from weight and volume measurements of each said separate quantity, determining from said calculations, and from the relationship between the specific gravity and the fat content of the meat, the fat content of each said quantity, distributing said separate quantities by way of a selecting step to a plurality of collecting vessels while determining the total fat content of the total meat quantity in each vessel, and, in said selecting step, directing each said separate quantity selectively, with reference to its fat content and in accordance with said total fat content determination, to one of said vessels to obtain said predetermined fat content.

2. The method of claim 1, in which said specific gravity calculation is effected by weighing a volume of pieces of meat, said volume being defined by compressing the pieces of meat in a container and determining the degree of filling of the container by the compressed meat.

3. The method of claim 2, comprising also evacuating air from the container during said compression.

References Cited

UNITED STATES PATENTS

| 3,050,399 | 8/1962 | Kielsmeier et al. | 99—109 |
| 3,177,080 | 4/1965 | Alberts | 99—108 |
| 3,282,115 | 11/1966 | Taylor et al. | 73—432 |
| 3,455,168 | 7/1969 | Taylor et al. | 73—432 |

HYMAN LORD, Primary Examiner

U.S. Cl. X.R.

99—108